United States Patent [19]

Matsumoto et al.

[11] Patent Number: 5,430,076

[45] Date of Patent: Jul. 4, 1995

[54] GLASS FIBER STRAND FOR REINFORCING A THERMOPLASTIC RESIN AND PROCESS FOR PREPARING A FIBER-REINFORCED RESIN PRODUCT

[75] Inventors: Mitsuhiro Matsumoto, Ageo; Akira Kitsunezuka, Koga; Hiroki Sato, Sowa; Shigeharu Arai, Shiraoka, all of Japan

[73] Assignee: Asahi Fiber Glass Company Limited, Tokyo, Japan

[21] Appl. No.: 9,011

[22] Filed: Jan. 26, 1993

[51] Int. Cl.$^6$ ............................................. C08K 9/06
[52] U.S. Cl. ........................... 523/205; 523/209; 524/605; 524/606; 524/584; 524/611
[58] Field of Search ............... 523/205, 209; 524/589, 524/605

[56] References Cited

U.S. PATENT DOCUMENTS

| | | | |
|---|---|---|---|
| 4,037,011 | 7/1977 | Hattori et al. | 523/205 |
| 4,366,287 | 12/1982 | Thorpe | 523/205 |
| 5,039,719 | 8/1991 | Watanabe et al. | 523/205 |

FOREIGN PATENT DOCUMENTS

| | | | |
|---|---|---|---|
| 0409524 | 1/1991 | European Pat. Off. | 523/205 |
| 2-30646 | 2/1990 | Japan . | |
| 3-79631 | 4/1991 | Japan . | |
| 2077275 | 12/1981 | United Kingdom | 523/205 |

*Primary Examiner*—Mark Sweet
*Attorney, Agent, or Firm*—Oblon, Spivak, McClelland, Maier, & Neustadt

[57] ABSTRACT

A glass fiber strand for reinforcing a thermoplastic resin, consisting essentially of a strand of glass filaments having a sizing agent applied thereto and bundled, and an auxiliary resin capable of forming a polymer alloy with a main thermoplastic resin to be reinforced, coated on the surface of the strand.

5 Claims, No Drawings

GLASS FIBER STRAND FOR REINFORCING A THERMOPLASTIC RESIN AND PROCESS FOR PREPARING A FIBER-REINFORCED RESIN PRODUCT

BACKGROUND OF THE INVENTION

1. Field of the Invention

The present invention relates to a glass fiber strand useful for the preparation of a glass fiber-reinforced thermoplastic resin (FRTP) and a process for producing FRTP.

2. Discussion of Background

Thermoplastic resins are widely used for the production of various products such as parts of electrical and electronical equipments and of automobiles. In a case where a high strength is required, it is common to incorporate reinforcing fibers such as glass fibers into such resins or to form "polymer alloys" by mixing other thermoplastic resins into the thermoplastic resins in which the reinforcing fibers are to be incorporated.

A polymer alloy is a general term for a system prepared by incorporating to a main thermoplastic resin an additional resin (an auxiliary resin) to improve the performance or properties of the main thermoplastic resin. FRTP employing such a polymer alloy as the resin, is prepared by a method of heating and mixing the main thermoplastic resin and the auxiliary resin uniformly to form a polymer alloy and mixing reinforcing fibers thereto, or a method of mixing the above two types of resins and reinforcing fibers simultaneously.

In the former method, the resin is required to be heated twice (when the polymer alloy is prepared and when FRTP is prepared), whereby the process is cumbersome, and the resin is likely to be deteriorated by the heating twice.

The latter method has no such a difficulty, but the resins are required to be weighed and mixed each time, and when the two resins differ in the particle size or in the specific gravity, it tends to be difficult to mix them uniformly, and a fluctuation is likely to result in the quality of the product.

Further, in order to adequately improve the performance of the main thermoplastic resin in either method, a substantial amount of the auxiliary resin is required to be used, but if a large amount of the auxiliary resin is used, other properties of the main thermoplastic resin are likely to deteriorate.

For example, the impact strength of a polycarbonate at a low temperature can be improved by an addition of an impact strength modifier to the polycarbonate. However, in order to remarkably improve the impact strength, the amount of the impact strength modifier is required to be at least 10% by weight, whereby the performance of e.g. the tensile strength tends to deteriorate.

SUMMARY OF THE INVENTION

It is an object of the present invention to solve the above-mentioned problems of the prior art and to provide a glass fiber strand for reinforcing a thermoplastic resin, and a process for producing FRTP whereby the amount of the auxiliary resin required for the improvement of the desired performance or property can be reduced and FRTP of a uniform quality can readily be prepared.

The present invention provides a glass fiber strand for reinforcing a thermoplastic resin, consisting essentially of a strand of glass filaments having a sizing agent applied thereto and bundled, and an auxiliary resin capable of forming a polymer alloy with a main thermoplastic resin to be reinforced, coated on the surface of the strand.

Further, the present invention provides a process for preparing a fiber-reinforced resin product, which comprises kneading chopped strands of glass filaments having a sizing agent applied thereto and bundled, and a main thermoplastic resin to be reinforced, under heating, followed by molding the kneaded mixture, wherein an auxiliary resin capable of forming a polymer alloy with the main thermoplastic resin is coated on the surface of the chopped strands before kneading.

DETAILED DESCRIPTION OF THE PREFERRED EMBODIMENTS

Now, the present invention will be described in detail with reference to the preferred embodiments.

The glass fiber strand to be used in the present invention, is prepared by applying a sizing agent to glass filaments and bundling the glass filaments into a strand. The sizing agent usually comprises from 1 to 20% by weight of a film former, from 0 to 10% by weight of a lubricant and from 0.1 to 1% by weight of a coupling agent. The film former may, for example, be an emulsion of a polyurethane or an epoxy resin. The lubricant may, for example, be a polyethylene glycol or an fatty acid amide. The coupling agent may, for example, be γ-aminopropyl-trimethoxysilane, N-β-(aminoethyl)-γ-aminopropyl-trimethoxysilane or γ-glycidoxy-propyl-trimethoxysilane. The sizing agent may further contain an antistatic agent such as ammonium chloride or a quaternary ammonium salt and other additives commonly employed for the preparation of a glass fiber strand.

The sizing agent is applied to the glass filaments in an amount of from 0.1 to 2.0 parts by weight (as solid content) per 100 parts by weight of the glass filaments.

The glass fiber strand prepared by bundling glass filaments having such a sizing agent applied as described above, is excellent in handling efficiency and free from fuzzing, and the auxiliary resin can readily and firmly be coated thereon. Further, when kneaded with the main thermoplastic resin, the dispersibility in the resin is excellent.

It is preferred to prepare the glass fiber strand by bundling from 20 to 4,000, preferably from 50 to 2,000, glass filaments having an average diameter of from 3 to 23 μm, preferably from 6 to 16 μm.

The auxiliary resin to be used in the present invention is capable of forming a polymer alloy with the main thermoplastic resin. As such a resin, it usually has a weight average molecular weight of at least 500, preferably at least 1,000, more preferably at least 10,000.

The auxiliary resin to be coated on the glass fiber strand before or after the strand is cut into chopped strands, is selected depending upon the type of the main thermoplastic resin to be reinforced, the property to be improved (such as the impact strength, chemical resistance or heat resistance) and the desired degree of improvement. The auxiliary resin to be used in the present invention may, for example, be an epoxy resin, an acrylate polymer, a polyamide, a polyolefin or a polyurethane.

For example, when a polybutyl acrylate resin is used to improve the impact strength of a polycarbonate resin, a particularly good result can be obtained. Selection of such an auxiliary resin, may be made based on any conventional polymer alloy compositions.

The amount of the auxiliary resin to be coated on the glass fiber strand or on the chopped strands, is determined depending upon the types of the auxiliary resin and the main thermoplastic resin to be reinforced and the blending ratio of the chopped strands and the main thermoplastic resin. However, it is usually from 0.1 to 30 parts by weight, preferably from 0.2 to 25 parts by weight, per 100 parts by weight of the glass fiber strand or the chopped strands. According to the present invention, the amount of the auxiliary resin required to obtain the desired performance or property can be reduced in this manner to a level of from 10 to 50% by weight of the amount required by the conventional method.

There is no particular restriction as to the method for coating the auxiliary resin. For example, a continuous glass fiber strand may be passed through a melt of the auxiliary resin so that the auxiliary resin is coated on the glass fiber strand, and then the strand may be passed through a dies to remove an excess amount of the auxiliary resin so as to control the coated amount of the auxiliary resin to a predetermined level.

A continuous glass fiber strand having the auxiliary resin coated thereon, is then cut into chopped strands, which are then used for the preparation of FRTP.

Instead of the above-mentioned melt of the auxiliary resin, an emulsion, suspension or solution of the auxiliary resin may be used. Otherwise, a continuous glass fiber strand having a binder applied thereto may be passed through a powder of the auxiliary resin (preferably in such a state that the powder is fluidized) so that the auxiliary resin will be coated on the glass fiber strand.

Preferably, prior to coating the auxiliary resin, the glass fiber strand is cut into chopped strands having a length of from 1 to 13 mm. The auxiliary resin is applied on the chopped strands in the form of an emulsion, suspension or solution, followed by drying.

Then, the auxiliary resin-coated chopped strands and the main thermoplastic resin to be reinforced, are kneaded under heating, followed by molding of the kneaded mixture.

The main thermoplastic resin may, for example, be a polycarbonate, a polyamide, a polybutylene terephthalate, a polyethylene terephthalate, a polyphenylene sulfide, a polypropylene, a polyphenylene ether or a polyoxymethylene.

There is no particular restriction as to the method for producing FRTP by kneading the auxiliary resin-coated chopped strands and the main thermoplastic resin under heating and then molding the kneaded mixture, and any conventional method may be used.

For example, the chopped strands and the main thermoplastic resin are supplied into an extruder and kneaded under heating usually at a temperature of from 150° to 390° C., preferably from 190° to 350° C., followed by injection molding to obtain FRTP.

The blend ratio of the chopped strands to the main thermoplastic resin is determined depending upon the type of the main thermoplastic resin, the performance or properties required for FRTP, etc. However, it is usually such that the glass content in the kneaded mixture or in FRTP will be within a range of from 2 to 70% by weight, preferably from 3 to 60% by weight.

As mentioned above, the amount of the auxiliary resin in the present invention may be as low as from 10 to 50% by weight of the amount required by the conventional method.

The reason for such a remarkable result is not clearly understood. However, it is considered that when the auxiliary resin is coated on the surface of the chopped strands, the amount of the auxiliary resin in the main thermoplastic resin is larger in the vicinity of the interface between the glass fibers and the main thermoplastic resin.

The effect obtained by forming a polymer alloy by mixing the auxiliary resin to the main thermoplastic resin is most influenced by the nature of the resin in the vicinity of the interface between the glass fibers and the main thermoplastic resin. The influence of the nature of the resin far from the interface is considered to be relatively small as compared with the influence of the nature of the resin in the vicinity of the interface. Thus, it is believed that according to the present invention, even if the amount of the auxiliary resin is relatively small, the amount of the auxiliary resin in the vicinity of the interface is large, whereby a substantial effect for improving the performance or property can be obtained.

According to the present invention, a main thermoplastic resin to be reinforced and chopped strands of glass filaments having a sizing agent applied thereto and bundled, having an auxiliary resin capable of forming a polymer alloy with the main thermoplastic resin coated thereon, are kneaded under heating, followed by molding of the kneaded mixture, whereby a polymer alloy can be formed in a single step, cumbersomeness of weighing and mixing the main thermoplastic resin and the auxiliary resin each time, can be eliminated, and fluctuation in the quality of the product due to separation of the main thermoplastic resin and the auxiliary resin can be prevented.

Further, by coating the auxiliary resin on the surface of the glass fiber chopped strands, the amount of the auxiliary resin will be made larger in the vicinity of the interface between the glass fibers and the main thermoplastic resin, whereby with a smaller amount of the auxiliary resin, a substantial effect for improving the performance or property can be obtained.

Now, the present invention will be described with reference to Examples and Comparative Examples. However, it should be understood that the present invention is by no means restricted by such specific Examples.

EXAMPLE 1

A sizing agent comprising 5% by weight of polyurethane and 0.5% by weight of aminosilane, was applied to glass filaments having a diameter of 13 μm in an amount of 0.5 part by dry weight per 100 parts by weight of the glass filaments, and 1,000 such glass filaments were bundled to form a glass fiber strand.

To this glass fiber strand, an emulsion of polybutyl acrylate having a weight average molecular weight of about 200,000 as an auxiliary resin was applied by a roll coater so that the polybutyl acrylate was coated in an amount of 10 parts by weight (solid content) per 100 parts by weight of the glass fiber strand. Then, this glass fiber strand was cut into chopped strands having a length of 3 mm. Using 110 parts by weight of the auxiliary resin-coated chopped strands and 557 parts by weight of a polycarbonate (Panlite 1225WP, tradename, manufactured by Teijin Chemicals Ltd.) as a main thermoplastic resin, test specimens were prepared by kneading at a resin temperature of 295° C., and the Izod impact strength was measured in accordance with JIS K-7110. The results as well as the composition of the test specimens are shown in Table 1.

COMPARATIVE EXAMPLE 1

A glass fiber strand was prepared in the same manner as in Example 1 and cut into chopped strands having a length of 3 mm without application of an auxiliary resin.

Using 100 parts by weight of the chopped strands, 10 parts by weight of the same polybutyl acrylate as used in Example 1 and 557 parts by weight of the same polycarbonate as used in Example 1, test specimens were prepared and the Izod impact strength was measured in the same manner as in Example 1. The results as well as the composition of the test specimens are shown in Table 1.

TABLE 1

|  | Example 1 | Comparative Example 1 |
| --- | --- | --- |
| Glass content (wt %) | 15 | 15 |
| Polybutyl acrylate (wt %) | 1.5 | 1.5 |
| Polycarbonate (wt %) | 83.5 | 83.5 |
| Izod impact strength (kgcm/cm) Notched | 17 | 13 |

EXAMPLE 2

A glass fiber strand was prepared in the same manner as in Example 1 and cut into chopped strands having a length of 3 mm.

Then, a novolac epoxy resin (Epikote 154, tradename, manufactured by Shell Chemical; weight average molecular weight: about 650) as an auxiliary resin was applied to the chopped strands so that 1.3 parts by weight of the resin was coated per 100 parts by weight of the chopped strands.

Using 101.3 parts by weight of the auxiliary resin-coated chopped strands, and 232 parts by weight of a polybutylene terephthalate (Duranex 2000, tradename, manufactured by Polyplastics Co., Ltd.) as a main thermoplastic resin, test specimens were prepared by kneading at a resin temperature of 280° C., and the tensile strength was measured in accordance with JIS K-7113. The results as well as the composition of the test specimens are shown in Table 2.

COMPARATIVE EXAMPLE 2

Chopped strands were prepared in the same manner as in Example 2.

Using 100 parts by weight of the chopped strands, 1.3 parts by weight of the same novolac epoxy resin as used in Example 2 and 232 parts by weight of the same polybutylene terephthalate as used in Example 2, test specimens were prepared and the tensile strength was measured in the same manner as in Example 2. The results as well as the composition of the test specimen are shown in Table 2.

TABLE 2

|  | Example 2 | Comparative Example 2 |
| --- | --- | --- |
| Glass content (wt %) | 30 | 30 |
| Novolac-epoxy resin (wt %) | 0.4 | 0.4 |
| Polybutylene terephthalate (wt %) | 69.6 | 69.6 |
| Tensile strength (kg/mm$^2$) | 15.8 | 15.3 |
| Tensile strength after hydrothermal treatment*[1] | 9.0 | 7.3 |
| Retention of tensile strength (%) | 57.0 | 47.8 |

*[1]Hydrothermal treatment: The test specimen was immersed in an autoclave at 105° C. for 72 hours.

EXAMPLE 3

A sizing agent comprising 4.0% by weight of an epoxy resin and 0.5% by weight of an epoxy silane, was applied to glass filaments having a diameter of 13 μm in an amount of 0.5 part by dry weight per 100 parts by weight of the glass filaments, and 1,000 such glass filaments were bundled to obtain a glass fiber strand. This glass fiber strand was cut into chopped strands having a length of 3 mm.

Maleic anhydride-modified polypropylene having a weight average molecular weight of about 4,500 as an auxiliary resin was applied to the chopped strands so that 1.7 parts of maleic anhydride-modified polypropylene was coated per 100 parts by weight of the chopped strands.

Using 101.7 parts by weight of the auxiliary resin-coated chopped strands and 232 parts by weight of polypropylene (J3054H, tradename, manufactured by Idemitsu Petrochemical Co., Ltd.) as a main thermoplastic resin, test specimens were prepared by kneading at a resin temperature of 215° C., and the tensile strength, flexural strength and Izod impact strength were measured by JIS K-7113, K-7203 and K-7110, respectively. The results as well as the composition of the test specimens are shown in Table 3.

COMPARATIVE EXAMPLE 3

Chopped strands were prepared in the same manner as in Example 3.

Using 100 parts by weight of the chopped strands, 1.7 parts by weight of the same maleic anhydride-modified polypropylene as used in Example 3 and 232 parts by weight of the same polypropylene as used in Example 3, test specimens were prepared and the physical properties were measured in the same manner as in Example 3. The results as well as the composition of the test specimens are shown in Table 3.

TABLE 3

|  | Example 3 | Comparative Example 3 |
| --- | --- | --- |
| Glass content (wt %) | 30 | 30 |
| Maleic-anhydride-modified polypropylene (wt %) | 0.5 | 0.5 |
| Polypropylene (wt %) | 69.5 | 69.5 |
| Tensile strength (kg/mm$^2$) | 8.5 | 5.0 |
| Flexural strength (kg/mm$^2$) | 13.0 | 9.0 |
| Izod impact strength (kgcm/cm) Notched | 10.0 | 8.0 |

EXAMPLE 4

A glass fiber strand was prepared in the same manner as in Example 1 and cut into chopped strands having a length of 3 mm.

A polybutyl acrylate having a weight average molecular weight of about 200,000 as an auxiliary resin was applied to the chopped strands so that 10 parts by weight of the polybutyl acrylate was coated per 100 parts by weight of the chopped strands.

Using 110 parts by weight of the auxiliary resin-coated chopped strands and 223 parts by weight of nylon 66 (Amilan CM3001, tradename, manufactured by Toray Industries, Inc.) as a main thermoplastic resin, test specimens were prepared by kneading at a resin temperature of 280° C., and the tensile sterngth and Izod impact strength were measured in accordance with JIS K-7113 and K-7110, respectively. The results as well as the composition of the test specimen are shown in Table 4.

COMPARATIVE EXAMPLE 4

Chopped strands were prepared in the same manner as in Example 4.

Using 100 parts by weight of the chopped strands, 10 parts by weight of the same polybutyl acrylate as used in Example 4 and 223 parts by weight of the same nylon 66 as used in Example 4, test specimens were prepared and the physical properties were measured in the same manner as in Example 4. The results as well as the composition of the test specimens are shown in Table 4.

TABLE 4

|  | Example 4 | Comparative Example 4 |
|---|---|---|
| Glass content (wt %) | 30 | 30 |
| Polybutyl acrylate (wt %) | 3 | 3 |
| Nylon 66 (wt %) | 67 | 67 |
| Tensile strength (kg/mm$^2$) | 16.1 | 15.9 |
| Izod impact strength (kgcm/cm) |  |  |
| Notched | 13 | 11 |

TABLE 4-continued

|  | Example 4 | Comparative Example 4 |
|---|---|---|
| Without notch | 98 | 72 |

What is claimed is:

1. A process for preparing a fiber-reinforced resin product, which comprises:
   bundling glass filaments having a sizing agent applied thereto, into a strand;
   cutting the strand into chopped strands having a length of from 1 to 13 mm;
   coating on the chopped strands an auxiliary epoxy resin which is capable of forming a polymer alloyed with a polybutylene terephthalate thermoplastic resin to be reinforced;
   kneading the auxiliary epoxy resin-coated chopped strands and said polybutylene terephthalate thermoplastic resin to be reinforced, while heating the combined material; and
   molding the kneaded mixture.

2. The process according to claim 1, wherein the sizing agent is applied to the glass filaments in an amount of from 0.1 to 2.0 parts by weight per 100 parts by weight of the glass filaments.

3. The process according to claim 1, wherein the sizing agent comprises from 1 to 20% by weight of a film former, from 0 to 10% by weight of a lubricant and from 0.1 to 1% by weight of a coupling agent.

4. The process according to claim 1, wherein the auxiliary resin is coated on the chopped strands in an amount of from 0.1 to 30 parts by weight per 100 parts by weight of the chopped strands.

5. The process according to claim 1, wherein the chopped strands and the main thermoplastic resin are kneaded so that the glass content in the kneaded mixture is within a range of from 3 to 60% by weight.

* * * * *